Nov. 25, 1930.   F. K. KILIAN   1,782,622
ANTIFRICTION ROLLER
Filed Feb. 19, 1929
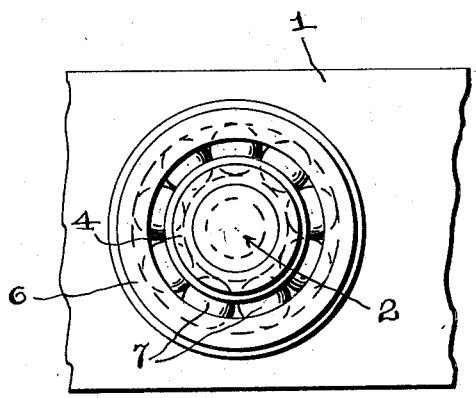
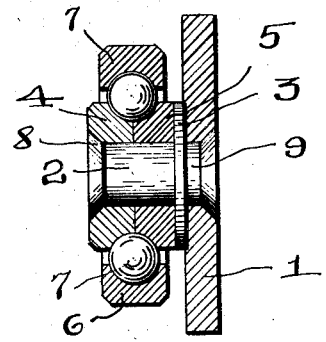
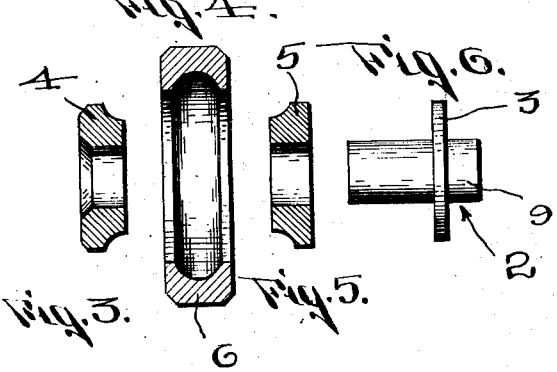
INVENTOR
Frederick K. Kilian
BY Frederic G. Bodell
ATTORNEY Patented Nov. 25, 1930

1,782,622

UNITED STATES PATENT OFFICE

FREDERICK K. KILIAN, OF SYRACUSE, NEW YORK

ANTIFRICTION ROLLER

Application filed February 19, 1929. Serial No. 341,146.

This invention relates to ball bearing or antifriction rollers such as are used on the drawers of cabinets to run along tracks in the cabinets during the opening and closing of the drawer and it has for its object, a particularly simple unitary roller or bearing construction by which the roller or bearing is attachable to a support.

The invention consists in the novel features and in the combinations and constructions hereinafter set forth and claimed.

In describing this invention, reference is had to the accompanying drawing in which like characters designate corresponding parts in all the views.

Figure 1 is an elevation of this antifriction roller and the contiguous portions of the support therefor.

Figure 2 is a vertical sectional view taken centrally on Figure 1.

Figure 3 is a vertical sectional view of one of the sections of the inner raceway.

Figure 4 is a similar view of the outer raceway.

Figure 5 is a view similar to Figure 3 of the other section of the inner raceway.

Figure 6 is an elevation of the stud.

This ball bearing roller for cabinet drawers and the like comprises generally, a stud having a collar between its ends and near one end, the portion of the stud on one side of the collar constituting an axle and on the other side of the collar constituting a stem for securing to a support, inner and outer raceways and balls between the raceways, the outer raceway constituting a roller, the inner raceway being mounted on the axle and abutting against the collar and the outer end of the stud or raceway having means for holding the inner raceway in position against the collar.

1 designates the support which may be a part of, or a part associated with the drawer.

2 is the stud having a collar 3 near one end thereof.

4 and 5 are sections of the inner raceway mounted on the stud or the axle part thereof, one section abutting against the collar.

6 is the outer raceway which serves as a roller to run along the track and 7 the balls between the raceways. The parts are held assembled by upsetting as by riveting or spinning the outer end of the stud or axle 2 over onto the outer face of the inner raceway section 4 as at 8, the section 4 being formed with a conical countersink in which the end of the stud is upset as by riveting or spinning. The collar 3 is of substantially the same diameter as the inner raceway.

9 designates the stem portion of the stud, that is, the portion on the opposite side of the collar 3 to that on which the raceways are located, the stem extending through a hole in the support 1 and being secured to the support by upsetting the end of the stud by riveting or spinning into a conical recess in the outer face of the support.

This bearing construction is particularly advantageous in that it is extremely economical in construction and applied as a unit to the support for the reason that the securing means is part of the stud or axle on which the inner raceways are mounted.

What I claim is:

1. A ball bearing roller structure comprising a stud having a collar between its ends, inner and outer raceways, the inner raceway comprising separable sections mounted on the stud on one side of the collar, one section abutting against the collar, and the outer end of the stud being provided with means coacting with the other section to hold the sections together against the collar, balls between the inner and outer raceways, the outer raceway serving as a roller, the portion of the stud on the other side of the collar to that on which the raceways are mounted, serving as a stem to attach the roller to a support with the collar abutting against the support, said collar serving to locate the raceways on the stud and to locate the stud relatively to the support, whereby the outer raceway serving as a roller is accurately positioned relatively to the support.

2. An antifriction bearing comprising, in combination, a stem portion, a collar formed integral with said stem portion, an inner raceway mounted on the stem portion and thrusting against one side of the collar, a roller having an outer raceway therein, and antifriction members between said raceways.

3. A ball bearing roller assembly comprising, in combination, a stem portion, a collar formed integral with said stem portion between the ends thereof, an inner raceway mounted on said stem portion and thrusting against one side of the collar, a roller having an outer raceway formed therewith, and ball bearings between said raceways.

4. A ball bearing roller assembly comprising, in combination, a stem portion, a collar formed integral with said stem portion between the ends thereof, a cone mounted on said stem portion and thrusting against one side of the collar, a complemental cone mounted on said stem portion, means holding said cones in operative position, ball bearings operative on said cones as an inner raceway, a roller having an outer raceway formed therein and mounted on said ball bearings.

5. A ball bearing roller assembly comprising, in combination, a stem portion composed of material soft enough to be riveted, a collar formed integral with said stem portion between the ends thereof, an inner raceway of hard material mounted on said stem portion and thrusting against one side of the collar, a roller having an outer raceway formed therewith, and ball bearings between said raceways.

In testimony whereof, I have hereunto signed my name, at Syracuse, in the county of Onondaga and State of New York, this 15th day of February, 1929.

FREDERICK K. KILIAN.